Figure 1:
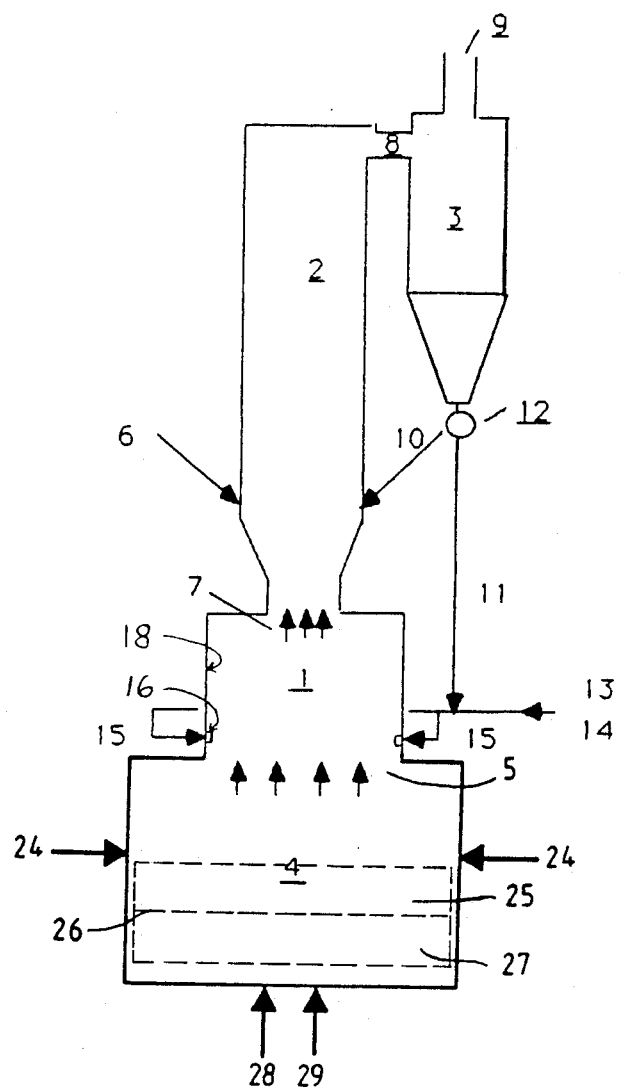

United States Patent [19]

Elvander et al.

[11] Patent Number: 4,976,776
[45] Date of Patent: Dec. 11, 1990

[54] METHOD FOR REDUCTION OF MATERIAL CONTAINING METAL OXIDE USING A FLUIDIZED BED REACTOR AND FLAME CHAMBER

[75] Inventors: Hans I. Elvander, Helsingborg, Sweden; Rolf E. Malmström, Helsingfors, Finland

[73] Assignee: A. Ahlstrom Corporation, Noormarkku, Finland

[21] Appl. No.: 323,922

[22] Filed: Mar. 15, 1989

[30] Foreign Application Priority Data

Mar. 30, 1988 [FI] Finland .................................. 881486
Jun. 22, 1988 [FI] Finland .................................. 882975

[51] Int. Cl.$^5$ ........................... C22B 1/10; C22B 5/14
[52] U.S. Cl. ...................................... 75/483; 75/453; 75/502; 75/639; 75/629
[58] Field of Search ................... 75/26, 35, 38, 40, 72, 75/82

[56] References Cited

U.S. PATENT DOCUMENTS

| | | | |
|---|---|---|---|
| 3,033,673 | 5/1962 | Collin et al. | 75/34 |
| 3,997,333 | 12/1976 | Fey | 75/26 |
| 4,073,642 | 2/1978 | Collin et al. | 75/34 |
| 4,087,274 | 5/1978 | Edenwall et al. | 75/91 |
| 4,359,212 | 11/1982 | Bengtsson et al. | 266/172 |
| 4,566,904 | 1/1986 | von Bogdandy et al. | 75/38 |

Primary Examiner—Melvyn J. Andrews
Attorney, Agent, or Firm—Nixon & Vanderhye

[57] ABSTRACT

A method and apparatus for producing, in a reactor, a suitable prereduced product for final reduction from material containing metal oxide. The material is preheated in a fluidized bed by means of hot gases from a subsequent prereduction stage. The hot material is smelted and prereduced in a flame chamber utilizing hot reducing gases from a subsequent final reduction stage. The prereduced material is completely reduced in the final reduction stage.

19 Claims, 3 Drawing Sheets

METHOD FOR REDUCTION OF MATERIAL CONTAINING METAL OXIDE USING A FLUIDIZED BED REACTOR AND FLAME CHAMBER

The present invention relates to a method for preheating and prereducing material containing metal oxide, such as dressed ore or ore concentrate, in order to produce a prereduced product suitable for final reduction. The invention particularly relates to a process in which the material containing metal oxide is supplied to a flame chamber disposed above a final reducing stage and is, at least partially, smelted and prereduced therein. The material in the flame chamber is brought into a rotational movement, after which it is conducted downwards to the final reducing stage.

The present invention also relates to an apparatus for preheating and prereducing material containing metal oxide, such as dressed ore or ore concentrate, in order to produce a product suitable for final reduction. This invention particularly relates to an apparatus comprising a flame chamber whose discharge end for smelted and prereduced material located in the lower part of the flame chamber, is connected with a final reduction stage. The apparatus is provided with inlet gates for feeding of preheated material containing metal oxide into the flame chamber, and means for bringing the material containing metal oxide into a rotational movement inside the flame chamber.

Prior methods for direct reduction into molten metal of materials containing metal oxide have been proposed, e.g., methods where the metal oxide is reduced in direct contact with molten metal in a smelt bath by carbonaceous material dissolved in the smelt. The metal oxide is fed to the smelt bath together with carbon or oil. The reaction $$C + MeO = Me + CO$$

in the smelt is endothermal and requires additional heat. The heat may be generated, e.g., by combustion of the CO gas which is produced in the reduction process.

It is however difficult, to a sufficient extent, to transfer the heat released by the combustion of the CO gas to the smelt. Various methods have been suggested for easier transfer of the heat to the smelt and the metal oxide. It has been suggested to carry out the reduction in a rotating reactor whereby the heat generated by the combustion is transferred to the smelt via the furnace lining. This method would demand a great deal of the furnace lining.

It has also been suggested to supply the heat required for the reduction process by electric energy. According to this method, the heat produced by the combustion of the gases formed in the reduction process is utilized for generating electric energy, which will completely or partially be utilized for heating the smelt. Even if the entire heat content of the exhaust gases were utilized, the electric energy produced from the exhaust gases would not be sufficient to both meet the energy requirement of the reduction process and to cover the heat losses. Additional energy would be demanded. Additional fuels may be used for preheating and/or prereducing material containing metal oxide or for generating electric energy in order to meet the heat requirement of the reactor.

It is also prior art, e.g., disclosed in the Swedish patent SE No. 419 129, completely or partially to reduce finely-divided material containing iron oxides in a circulating fluid bed reactor consisting an upper and a lower reaction chamber which are connected with each other. Iron ore concentrate is fed into the lower reaction chamber. Carbonaceous material is introduced into the upper chamber and yields the reducing gas required for the reduction on one hand, and on the other hand, meets the heat requirement in the reactor through partial combustion. Combustion air is fed into the upper reaction chamber. Exhaust gases which are withdrawn from the reactor and cleaned, are recirculated to the lower reaction chamber and utilized for fluidization in the reactor and as reducing agent. The reduction takes place in the circulating fluid bed at a temperature lower than the melting point of iron. According to an example in the patent, pulverulent coal was supplied at a rate of 70 kg/ton Fe.

The kinetics for the reduction reaction $Fe_2O_3 - FeO$ is unfavourable at the low temperatures which appear in reactors with fluidized beds, e.g., of the type described above. At 800° C., reaction times of several minutes, possibly tens of minutes are obtained, depending on the grain size and the desired degree of reduction. A rise in temperature that would effect an acceptable reaction speed is out of the question in a circulating fluid bed reactor, because the sintering tendency of the particles would increase at the same time.

Prereduction of metal oxide at 800° C. in a reactor with a fluidized bed calls for a certain reduction potential in the reducing gas. In a state of equilibrium, this leads to the fact that the gas will, even when discharged, contain a considerable amount of reducing components such as CO and $H_2$. Through recirculation of the gas, combined with separation of, among other things, $CO_2$ and $H_2O$, the reducing components can be better utilized. Through gasification of part of the carbonaceous reducing agent in the fluid bed, a sufficient reducing potential could be upheld but, without other simultaneous steps, this would impair the energy efficiency of the process.

It is also prior art, disclosed in the Swedish patent SE No. 395 017, to prereduce metal oxide-containing material in a shaft in a molten condition, i.e., at higher temperatures than described above. In the upper portion of the shaft, where oxidizing atmospheric conditions prevail, heat is generated through the combustion of solid, fluid or gaseous fuels. The material containing metal oxides is caused to fall downward in the shaft to be heated and molten by contact with the hot gases that have been produced. The material is partially prereduced by the combustion gases. The reduction is, however, essentially carried out in the lower portion of the shaft with a carbonaceous reducing agent, which is introduced into the upper portion of the shaft and is cokified there, after which it falls down to the lower portion of the shaft and causes there a reducing atmosphere. Part of the carbonaceous reducing material fed into the upper portion of the shaft is also utilized to produce heat. The shaft must, in other words, be provided with energy for both heating, melting and reducing of the material containing metal oxide. The exhaust gases will consequently contain a great amount of energy. The problem with this process is how to optimize the use of this energy.

As, in addition to this, both drops of molten metal oxides and solid particles of the reducing agent, metal oxides and possibly other auxiliary substances used in the process are entrained by the gases moving upwards in the shaft, the cleaning of the exhaust gases will present great problems. The metal oxide particles can be separated from the exhaust gases, preferably when the gases have been cooled down to a temperature at which all molten particles have solidified and can no longer block the particle separator and gas cleaner, preferably to temperatures under 1000° C. After the cooling and separation, the particles can be returned to the process, but must now be heated again, which causes a fall in the energy efficiency. The cooling of the gases down to under 1000° C., possibly in connection with heat recovery, also presents practical difficulties.

It is an object of the present invention to provide an improvement on the prereduction processes described above.

It is also an object of the present invention to provide a method whereby the energy content of the gases formed in the subprocesses is utilized for the total process in order to minimize the demand for energy for the production of the molten metallic product.

Thus, it is the object of the invention to provide a method with better energy economy and better kinetics for the reduction.

It is also an object of the invention to provide a method by means of which the solid and molten particles which are discharged from the prereduction stage in the flame chamber together with the exhaust gases can be separated and returned to the prereduction stage in a simple manner, whereby thus smaller amounts and, at the same time, cleaner exhaust gases are produced.

According to the present invention, the problems involved in the reduction processes described above are dealt with in an surprisingly simple manner by feeding the material containing metal oxide into a reactor provided with a fluidized bed and connected to the flame chamber, and heating it therein prior to feeding it into the flame chamber. Hot gases from the flame chamber are fed into the lower portion of the reactor as fluidizing gases. The hot gases preheat the material in the reactor at the same time. The material containing metal oxide is preheated in the fluidized bed after which it is separated from the exhaust gases emerging from the reactor, and is either returned to the reactor or fed into the flame chamber. Thereafter the introduced, preheated material containing metal oxide is melted and/or prereduced in the flame chamber by using the hot reducing gases from the final reduction stage.

Preheating and prereduction of the metal oxide containing material can, according to the present invention, be carried out in an apparatus comprising a reactor with a fluidized bed, which is connected to the upper portion of the flame chamber, for preheating of the material containing metal oxide prior to it being fed into the flame chamber. The reactor is provided with an inlet for hot exhaust gases from the flame chamber at its lower portion and, at its upper portion, it is connected with a particle separator for separating preheated material containing metal oxide from the gases emerging from the reactor. The particle separator is connected to the lower portion of the reactor through a return duct and through an inlet duct to the flame chamber. The flame chamber is preferably at its lower portion connected to an inlet for hot reducing gases from the final reduction chamber.

The preheated material containing metal oxide can, according to the invention, be melted in the flame chamber directly by means of the heat content of the hot upward-going gases from the final reduction stage, whereby the material containing metal oxide is preferably fed into the lower portion of the flame chamber. The material containing metal oxide is fed in the way that the best possible contact is achieved between the material and the upward-moving gases, whereby both melting and prereduction of the material can take place in the lower portion of the flame chamber. The upward-moving gases take the molten and preheated material higher up in the flame chamber, where the material is brought into a rotating movement and slung against the walls of the flame chamber. In molten condition, the prereduced material then flows downward to the final reduction stage.

The preheated material may also be melted using the heat from the combustion of part of or the entire amount of the reducing gases in the flame chamber itself. Precombustion can take place in the upper or lower portion of the flame chamber, depending on the feeding point of the combustion-promoting medium. Air, oxygen-enriched air, or the like, may be used for the combustion.

The gases produced at the final reduction stage are preferably fed upward through the opening in the bottom of the flame chamber by which molten material containing metal oxide flows down to the final reduction stage. In some cases, the gases can however be introduced via inlet gates situated at the sides or the upper portion of the flame chamber. A good contact between the gases and the preheated material containing metal oxide must be provided.

The reducing gases from the final reduction may be completely or partially burned in the flame chamber and utilized for both melting and reduction of the preheated ore concentrate without it having a harmful effect on the prereduction process in the flame chamber, this resulting from the fact that the combustion and prereduction take place in different zones of the flame chamber. This leads to the maximum utilization of the reduction potential of the gases and to the minimum reduction potential of the outgoing gases.

Depending on the proportion of the reducing gas consumed by combustion, other reducing agent may be added to satisfy the need for the reducing agent in the prereduction of the material containing metal oxide. According to one embodiment of the invention, carbonaceous material is used as a reducing agent. The carbonaceous material is fed into the flame chamber, preferably simultaneously with the combustion-promoting gas. The combustion-promoting gas burn the upward-moving reducing gases thus producing hot flames and zones with high combustion potential, preferably in the center of the flame chamber. Volatile substances in the coal can also be burnt. Preferably, the retention time of the carbon in the hot flame is not long enough for it to burn to any great extent, but only cokify. The material containing metal oxide is introduced in the way that it is brought into contact with the hot flames and melts. The smelt and the coke produced are brought into a rotating movement and slung against the wall of the flame chamber.

The coke particles contribute in building up a reducing zone adjacent the wall, whereby the metal oxide is reduced in a mainly molten condition. The gases by the wall of the flame chamber do not necessarily have to be in equilibrium with the gases in the centre of the flame chamber.

When an additional reducing agent consisting, e.g., of carbonaceous material is introduced into the flame chamber, it should preferably have a particle size large enough for the reducing agent not immediately to burn in the flame, but mainly cokify. The carbonaceous medium will then in unburnt condition be slung against the wall and there be mixed as coke particles in the smelt of metal oxide. The presence of coke particles leads to a high reduction potential in gas bubbles in the smelt and in the gas layer upon the smelt, which results in a layer of a few millimeters of molten, prereduced metal oxide in continuous downward-flowing movement on the surface of the wall.

The flame chamber in the embodiment described above can preferably be shaped as a cyclone, where solid and fluid particles are separated from the gases. The average retention time for the gases inside the flame chamber is a few tenths of seconds. Despite the brief retention time, the gases are capable of releasing heat, thus heating the particles and causing them to melt, due to the intensive turbulence in the cyclone. The turbulence enhances the radiation and convection heat transfer to the suspended particles. The retention time of the molten metal oxide and the cokified reducing agent is a few seconds, that being the time the material is retained on the walls.

For example, a flame chamber with an upper diameter, d1, of 2460 mm and a lower diameter, d2, of 1920 mm and a height, h, of 1700 mm is fed with 7.5 t/h of ore concentrate. The temperature in the flame chamber is 1600° C. to 1700° C. a molten, prereduced layer is now formed on the wall of the flame chamber. The retention time of the gases is about 0.2 seconds. However, the smelt running down the wall is retained for approx. 10 seconds. The prereduction in the flame chamber is accomplished rapidly, as the material containing metal oxide, thanks to the preheating, rapidly reaches a temperature favourable for the reduction. The material containing metal oxide ha already, in other words, a relatively high temperature on being introduced into the prereduction stage. The material is preheated, but only up to a point which i below the temperature where the material turns sticky, this in order to prevent agglomeration in the fluidized bed. A temperature between 600° C. and 950° C. is usually found suitable. Particularly when the material containing metal oxide is introduced into the flame chamber in close contact with the hot flames or with hot reducing gases, the material will quickly be heated up to a temperature suitable for prereduction whereby the prereduction is carried out very quickly. For example, the reaction $Fe_2O_3$—$Fe_2O_4$—$FeO$ happens almost spontaneously at temperatures of over 1200°-1300° C.

One of the most important advantages with the method according to the invention lies in the improved energy economy. The need for auxiliary energy from the outside for prereduction and smelting is minimized when the metal oxides are introduced into the flame chamber preheated. Also the energy requirement at the final reduction itself is minimized by introducing the metal oxides prereduced and mainly in molten condition into the final reduction stage.

The energy content of the gases produced is utilized to a maximum. Firstly, the heat content is optimally utilized in the preheating of the ore concentrate in the fluidized bed, and secondly, the preheating can be carried out with gases which are practically completely combusted. In prior art processes with a fluidized bed, the preheating is preferably carried out by using reducing gases, the exhaust gases from the processes still having a considerable energy content which it has not been possible to utilize optimally.

Prereduction with metal oxide in solid phase, such as it is carried out, e.g., in a fluidized bed, would demand a higher content of CO in the reducing gases. This would in its turn lead to an increased demand of reducing gases from the final reduction stage and consequently an increased demand for carbon at the final reduction.

Prereduction in a smelt considerably lessens the need for reducing agent. If, on the other hand, the prereduction were carried out in a fluidized bed, the need for carbon would be considerably greater in order to uphold a sufficient reduction potential in the gas. By prereduction in molten state, at a temperature of 1500° C., the exhaust gases from the prereduction will only contain about 5% of CO, whilst they would, by prereduction at 800° C. in solid state, e.g., in a fluidized bed, still contain about 30% of CO.

The final reduction to metal of molten FeO naturally demands less energy than the final reduction of solid FeO. In the final reduction stage, the reduction of FeO takes place with C via CO, where the $CO_2$ which is formed, is immediately converted into CO, due to the carbon present in the reaction. Essentially CO is thus obtained from the reaction zone. If oxygen or air is supplied to the bath itself, the combustion results in CO only. Complete combustion of the CO produced can however take place above the surface of the bath. The combustion above the surface of the bath supplies the bath with auxiliary heat energy. THe gas above the bath can contain up to 60% of $CO_2$ without that having a harmful effect on the final reduction. The gas being formed still contains Co to a sufficient degree for covering the reduction potential and the heat requirement in the flame chamber. The heat requirement in the fluidized bed is, due to the preheating of the ore concentrate, less than than if the ore concentrate were fed non-preheated into the prereduction stage.

The energy requirement and the coal consumption in the method according to the invention is substantially less than that for a method where the prereduction is carried out in a fluid bed where the combustion and prereducing gases are mixed. In SE No. 419 129 a total coal requirement of 700 kg/ton Fe is given, a great proportion of the coal added is contained in the exhaust fumes as combustion heat. The energy requirement according to the invention is in the area between 400 kg/ton and 500 kg/ton Fe. From 5 to 30% of the total coal requirement can be supplied to the prereduction stage.

A further advantage of the invention is the substantially smaller final exhaust volume in the process according to the invention compared to other corresponding processes, due to a decreased coal requirement. As, in addition, the exhaust gases from the circulating bed reactor are essentially completely combusted, the invention contributes to an environmentally safer process. In the method according to the invention, the problems with cooled, poisonous and explosive gases, e.g., non-combusted gases containing CO and $H_2$, can be avoided. From a purely engineering point of view, simpler constructions are possible. In processes resulting in non-combusted gases, these are normally burnt with air in some final stage, which leads to great exhaust volumes and, consequently, higher costs. Furthermore, combustion with air contributes to increased $NO_x$ contents in the exhaust gases.

The advantageous effect that the fluidized bed has on the amounts of dust in the exhaust gases is remarkable. The molten drops and particles entrained by the gases from the flame chamber will be captured by the cold ore concentrate particles and immediately cooled to the reactor temperature, thus not causing problems when the gases are cleaned or returned to the flame chamber. Possible coal particles flowing out with the exhaust gases are taken care of in the same way and returned to the flame chamber.

Figure 3:
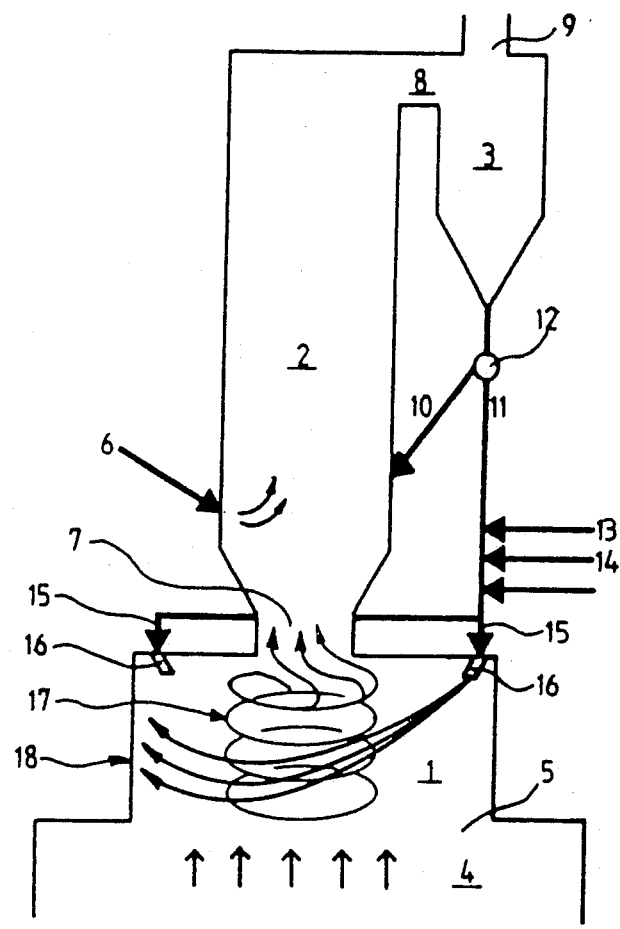
Figure 2:
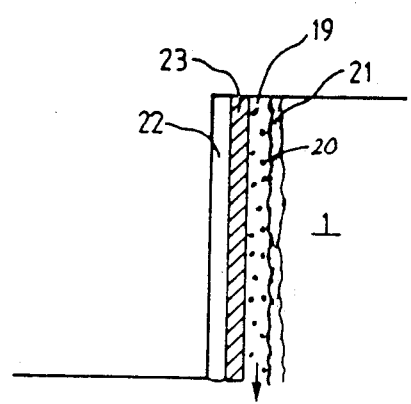
Figure 4:
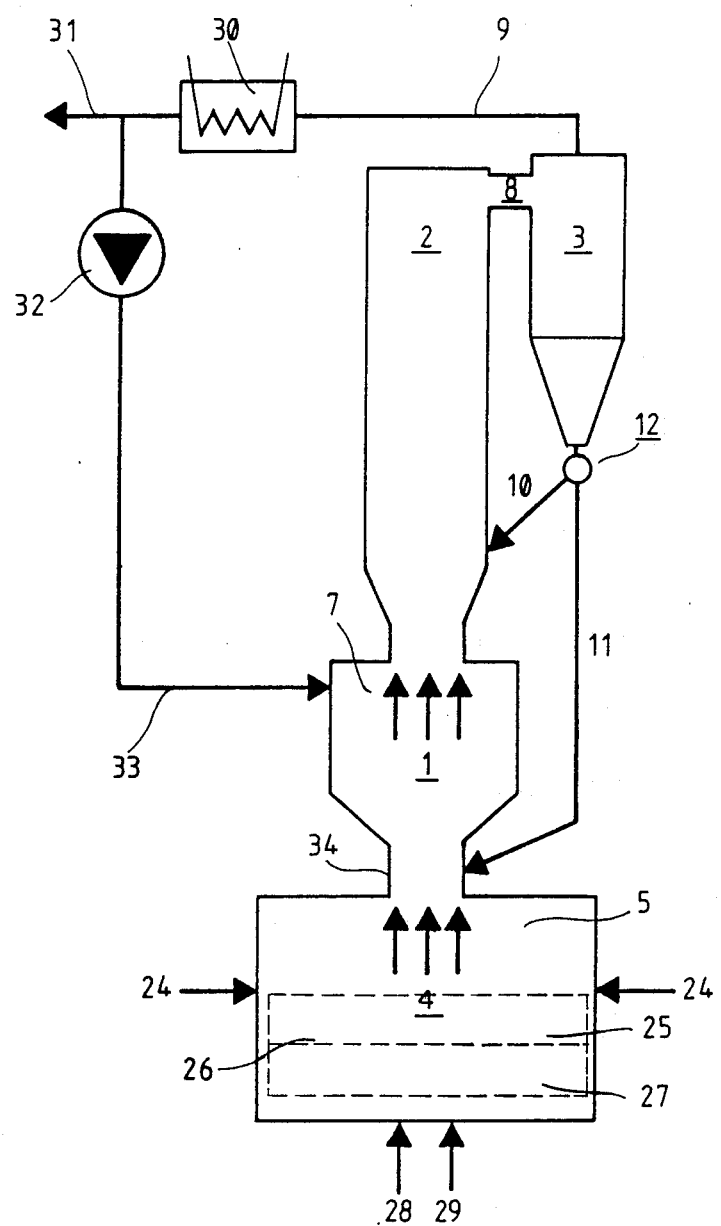

In the following, the invention is described in closer detail with reference to the attached drawings where FIG. 1 shows schematically an apparatus for carrying out the method according to the invention FIG. 2 shows an enlargement of the flame chamber wall FIG. 3 shows another embodiment of the apparatus and FIG. 4 shows still another embodiment of the apparatus.

The apparatus in FIG. 1 shows in general outline a flame chamber 1, a fluidized bed reactor 2, disposed on top of it and connected with a particle separator 3. The flame chamber is arranged on top of a final reduction means, e.g., a converter 4, which through an opening 5 at its upper portion is connected with the lower portion of the flame chamber.

Material containing metal oxide, e.g., dressed ore or ore concentrate containing iron 6 to be reduced is fed into the lower portion of the reactor 2. Simultaneously, hot gases at temperatures from approximately 1400° C. to 1800° C. flow from the flame chamber located below through an opening 7 into the reactor, fluidizing the ore concentrate fed therein. The temperature in the flame chamber, and thus also that of the exhaust gases, varies depending on which metal oxides are prereduced. Ni-oxides require higher and Cu-oxides lower temperatures than those mentioned above. The ore concentrate is heated by the hot gases in the reactor 2 up to a temperature which is under the sticking temperature of the material, from approximately 600° C. to 950° C. Even in this case, the temperature depends on which metal oxides are being preheated; the Ni-oxides require higher and the Cu-oxides lower temperature than the Fe-oxides. If the temperature of the incoming reducing gases is too high, they can be lowered immediately after or before the inlet to the circulating bed reactor, e.g., by recirculating part of the cleaned and cooled exhaust gases. Normally the total quantity of gas from the flame chamber is utilized for heating the ore concentrate, but if the temperature of the concentrate tends to become too high in the fluidized bed reactor, part of the exhaust gases from the flame chamber can instead be utilized for preheating the air, the fuel or the slag former.

The ore concentrate must have a particle size suitable for preheating and reduction. In most instances, particles with a diameter of <1 mm have proved to be suitable. The fluidizing gases transport the ore concentrate to the upper portion of the reactor and via a duct 8 out of the reactor to the particle separator 3. The figure shows a particle separator of vertical cyclone separator type, but some other separator or separating system suitable for the purpose can also be used. The cleaned exhaust gases are withdrawn from the separator via outlet 9. The separated particles are withdrawn from the lower portion of the cyclone separator either via a return conduit 10 back to the fluidized bed reactor 2, or via an inlet conduit 11 to the flame chamber. By means of a device 12, the proportion of the recirculated material to the material to be directly conducted to the flame chamber, can be regulated. In some cases, no recirculation to the reactor is needed, but in order to obtain even and quick heating of the ore concentrate, the circulating bed is advantageous in most instances. The massiveness of the circulating bed has a stabilizing effect on the heat transfer in the reactor without interfering with the energy balance itself. The retention time for the particles in a circulating bed is prolonged, and can easily be regulated, which results in a very flexible process.

Reducing agent in particle form, such a coal or coke 13, and combustion-promoting gas, such as air, oxygen-enriched air with, e.g., $\leq 17\%$ oxygen, or oxygen gas 14, is mixed into the material in the conduit 11. In a method in accordance with the invention, also low grade carbonaceous reducing agents such as peat, lignite and coal can be used. In certain processes, the reduction potential in the reducing gases from the final reduction stage is sufficient for prereducing the iron ore concentrate. In these cases, the supply of reducing agent to the flame chamber can be omitted. Slag former or fluxing agent can also be supplied to the flame chamber or the fluid bed reactor together with the ore concentrate or directly via separate inlets. Also the coal and the oxygen can be supplied directly to the flame chamber through separate inlets.

Before entering the flame chamber, conduit 11 is divided into a plurality of sub-conduits 15 numbering, e.g., 2-8, which are arranged in the form of a circle and enter the flame chamber via a nozzle 16. If the fluid bed reactor is provided with several parallel particle separators, the conduit 11 can enter the flame chamber from each individual separator via separate nozzles for each respectively.

In the embodiment that is shown, the nozzles are arranged in the form of a circle at the lower portion of the flamechamber. The nozzles direct the material supplied into the flame chamber obliquely upwards-inwards, tangentially to imaginary horizontal circles inside the flame chamber, these circles having a diameter which is less than the cross section of the flame chamber.

Hot reducing combustible gases such as CO and $H_2$ from the final reduction stage 4 flow via the opening 5 up into the flame chamber. The air or the oxygenous gas supplied via the nozzles 15 is well mixed with the combustible gases efficiently combusting the upwardly moving gases in an oxidizing zone in the centre of the flame chamber, thus generating heat for melting the metal oxide containing material being supplied. The gas being fed into the flame chamber in an obliquely upward-inward and tangential direction and at suitable speed brings about a cylconic effect which sets the material in a rotating motion inside the flame chamber contributing to efficient mixing of gas and particles. At the same time, the molten metal oxide containing material, as shown in FIG. 2, is slung outward against the walls 18 of the flame chamber forming a tin layer 19 of metal oxide smelt. Coke particles 20 which have not been combusted are mixed with the metal oxide smelt 19 effecting continuous reduction, whereby a thin reducing layer of gas 21 develops on the smelt, and partly in it, close to the wall. A portion of the particles containing coke follows with the smelt into the final reduction stage.

Material to be fed into the flame chamber can naturally be supplied through openings in the walls or the roof of the flame chamber without using regular nozzles, preferably in such manner that the material can be directed in a desired direction. All material, e.g., ore concentrate and oxygen, or possibly air, does not have be mixed prior to the flame chamber, but it is essential that the combustion-promoting gas is efficiently mixed with the gases in the flame chamber, and that the material containing metal oxide can efficiently absorb heat from the flames.

The walls of the flame chamber are preferably of membrane type, through the tubes of which water or steam flows. The membrane well cools the layer of metal oxide smelt closest to the wall, which will solidify and form a solid layer. This solid layer protects the wall against wear. The molten metal oxide flows continuously down the wall and will, in a molten state and prereduced, flow down to a final reduction stage, e.g., a converter 4, which is connected to the flame chamber.

The reducing gases moving upwardly in the flame chamber will burn completely in the oxidizing zone of the flame chamber by means of the oxygen supplied and be conducted from the flame chamber into the reactor 2 through the opening 7.

In FIG. 1, an apparatus provided with means for feeding material into the lower portion of the flame chamber is shown. In some cases it might be preferable to feed the material into the center or upper portion of the flame chamber. Even then the nozzles are directed in such a way that the reducing gases moving upward are burnt in hot flames in the center of the flame chamber while at the same time preserving a reducing layer by the walls of the chamber.

In the embodiment of the invention shown in FIG. 3, the nozzles 16 are arranged in a circle in he upper portion of the flame chamber. The nozzles direct the material obliquely downwards and inwards and tangentially to imagined horizontal circles 17 inside the flame chamber, these circles having a diameter less than that of the flame chamber. The material is brought into a rotating movement, which causes molten material to be slung against the walls 18 of the chamber. The ascending gases and the nozzles can be directed such that the smelt is distributed over the wall in a desired way.

The prereduced and at least partly molten metal oxide containing material flows down the walls in the flame chamber to the final reduction reactor 4, which may be, e.g., a converter. In the reactor, the completely reduced metal forms a smelt bath 27 on the bottom of the converter, and a layer of slag 26 on top of the molten metal.

The final reduction of the prereduced, downward-flowing molten material occurs substantially in the slag and the layer between the slag and and the smelt whilst forming reducing gases. At least two nozzles 24 are disposed in the wall of the reactor immediately above the slag layer for injecting oxygen or gas containing oxygen for the combustion of the reducing gases being formed. The nozzles are directed tangentially to an imagined horizontal circle with a diameter less than that of the reactor, whereby the mixture of gases inside the converter will be brought into a cyclonic movement. The oxygen-containing gas will sweep the surface of the slag layer and combust the reducing gases immediately on their formation upon the layer of slag thus transmitting heat to the slag layer and the bath. A gas containing 17% to 100% oxygen is preferably used. A good stirring of the bath by means of, e.g., inert gas contributes to a better transmission of heat from the combustion gases to the bath. The gases being formed in the final reduction stage ascend directly into the flame chamber flowing against the downward-flow of the prereduced material. It might be advantageous in certain cases to conduct the gases into the flame chamber from the side. This can be accomplished such that the combustion in the flame chamber mainly takes place in an oxidizing zone of the flame chamber, a reducing zone also being maintained in the flame chamber.

Final reduction agent such as stone coal or coke can be provided to the converter via inlet 28 into the metal smelt or via an inlet into the slag layer or above the slag layer. Oxygen is supplied via the inlet 29.

Fuel and oxygen-containing gas may be injected into the slag layer or the smelt in order to meet the energy requirement for the final reduction of non-molten metal oxides in the converter, 20%–60% of the reducing gases being formed can be combusted above the slag layer in a converter.

If additional energy to the smelt is supplied by electrodes, only 4% to 20% of the gases formed can be combusted above the slag layer. A higher temperature may be harmful to the electrodes.

Plasma-heated oxygen gas or regeneratively or recuperatively heated oxygen gas and/or air may be used to combust gases forming above the slag layer. Heat can be transmitted to the smelt itself via a luminous arc in a plasma-heated gas.

Part of the gases being formed may be taken out from the final reduction stage for recuperative or regenerative preheating.

FIG. 4 shows a means for a somewhat different embodiment of the invention. The flame chamber 1 has in this case a tapering lower end 34, to which the inlet conduit 11 for the preheated material containing metal oxide is connected. The object in this case is to both smelt and prereduce the preheated material by means of the hot reducing gases from the final reduction stage, substantially without any combustion of the hot gases or any addition of extra reducing agent. Hereby a very good contact between the preheated material and the hot reducing gases from the final reduction stage 4 should be arranged in the flame chamber. In the embodiment shown in the figure, the lower portion of the flame chamber is tapered in order to ensure effective mixing. The temperature in the lower portion may rise up to 1000° C. -1700° C., whereby the smelting and reduction is accomplished rapidly.

The reactions according to this method can be produced without practically any combustion-promoting gas, whereby a greater proportion of the reducing gases formed in the final reduction can be burnt in the converter in connection with their formation than were the case if the reducing gases were needed in a combustion process inside the flame chamber. Combustion of the gases in the converter is economically more advantageous than a combustion taking place in the flame chamber.

The rotating movement of the material in the flame chamber, which is needed for the molten material to be slung out against the walls and not be led up to the fluid bed reactor 2, is brought about through feeding exhaust gases via a conduit 33 from the fluid bed reactor into the flame chamber. The exhaust gases are conducted from the particle separator 3 partly out of the process via a heat exchanger 30 and partly up to the upper portion of the flame chamber via a conduit 33 forming a vortex in the material in the flame chamber. THe rotating movement can also be produced by other means, such as feeding in gas from a gasifier close to the flame chamber. The gas can be burnt in the flame chamber thus increasing the heat content inside the flame chamber.

The invention is not limited to the embodiments described above, but may vary within the scope of the attached claims.

What is claimed is:

1. A method for preheating and pre-reducing metal oxide containing material to produce a pre-reduced product suitable for final reduction, using a fluidized bed reactor having a lower portion open to a flame chamber which is open to a final reduction stage, comprising the steps of:
   (i) feeding the metal oxide containing material into a fluidized bed reactor;
   (ii) feeding hot exhaust gases from the flame chamber into the lower portion of the fluidized bed reactor for fluidizing and preheating the metal oxide containing material in the fluidized bed reactor;
   (iii) separating the preheated metal oxide containing material from the exhaust gases emerging from the fluidized bed reactor;
   (iv) effecting at least partial smelting and/or pre-reduction of the preheated metal oxide containing material by utilizing hot reducing gases from the final reduction stage;
   (v) recirculating a portion of the separated metal oxide containing material back into the fluidized bed reactor, and feeding the remainder into the flame chamber with a rotating movement to effect at least partial smelting and pre-reduction of the metal oxide containing material in the flame chamber; and
   (vi) after preheating and pre-reduction, moving the metal oxide containing material downwardly to a final reduction stage.

2. A method as recited in claim 1 wherein the metal oxide containing material is selected from the group consisting of dressed ore and ore concentrate.

3. A method according to claim 11 comprising the additional step (vii) of feeding combustion-promoting gas into the flame chamber.

4. A method according to claim 3, wherein step (vii) is practiced by feeding air into the flame chamber.

5. A method according to claim 3, wherein step (vii) is practiced by feeding oxygen gas into the flame chamber.

6. A method according to claim 3, comprising the additional step of burning hot reducing gas from the final reduction in the flame chamber to smelt the metal oxide material.

7. A method according to claim 3 comprising the additional step of feeding carbonaceous material into the flame chamber.

8. A method according to claim 7 comprising the additional step of creating a hot zone inside the flame chamber having a high degree of combustion.

9. A method according to claim 7 comprising the additional step of creating a hot zone inside the flame chamber having hot flames, and creating a reducing zone close to the walls of the flame chamber.

10. A method as in claim 8 wherein the step of creating a hot zone is practiced by creating a hot oxidizing zone which smelts the metal oxide containing material and at least partially converts carbonaceous material into coke, and comprising the additional step of slinging molten metal oxide outwardly against the walls of the flame chamber to form a reducing zone for the reduction of the molten metal oxide.

11. A method according to claim 1 using a lower portion of the flame chamber comprising the additional step of supplying the separated metal oxide containing material to the lower portion of the flame chamber at a position where the hot reducing gases are being heated in the final reduction step so that good contact is made between the reducing gases and the metal oxide containing material.

12. A method according to claim 1 wherein step (v) is practiced by feeding the separated metal oxide containing material into flame chamber such that the metal oxide containing material is slung outwardly against the walls of the flame chamber.

13. A method according to claim 12 comprising the additional step of feeding gas into the flame chamber to create the rotating movement of the metal oxide containing material in the flame chamber.

14. A method according to claim 1 comprising the additional step of supplying a reducing agent to the flame chamber to reduce the metal oxide containing material.

15. A method according to claim 1 wherein the step (ii) is practiced by preheating the metal oxide containing material in the fluidized bed reactor up to a temperature which does not exceed the sticking temperature of the material.

16. A method according to claim 1 wherein step (v) is practiced by heating the remainder of the separated metal oxide containing material in the flame chamber up to a temperature at which the material is mainly molten.

17. A method according to claim 1 comprising the additional step of capturing vaporized metal oxide containing material rising from the flame chamber on cooler particles in the fluidized bed.

18. A method according to claim 1 comprising the additional step of using the energy content of the gases formed in the final reduction stage to minimize the energy requirement for step (v).

19. A method according to claim 11 using a bath of molten metal having a layer of slag in the final reduction stage, comprising the additional steps of:
   (vii) completely reducing the metal oxide containing material in the bath of molten metal and the layer of slag floating on top of the molten metal in the final reduction stage; and
   (viii) partially burning the gases formed during step (vii) by injecting combustion-promoting gases over the surface of the slag layer.

* * * * *